US009136638B2

(12) United States Patent
Billault et al.

(10) Patent No.: US 9,136,638 B2
(45) Date of Patent: Sep. 15, 2015

(54) CONNECTION DEVICE FOR A SUBMERSIBLE CONNECTOR

(75) Inventors: Michel Billault, Carnoux en Provence (FR); Stéphan Beurthey, Roquefort la Bedoule (FR)

(73) Assignees: CENTRE NATIONAL DE LA RECHERCHE SCIENTIFIQUE, Paris Cedex (FR); UNIVERSITE D'AIX MARSEILLE, Marseille Cedex (FR)

( * ) Notice: Subject to any disclaimer, the term of this patent is extended or adjusted under 35 U.S.C. 154(b) by 151 days.

(21) Appl. No.: 13/381,147

(22) PCT Filed: Jul. 1, 2010

(86) PCT No.: PCT/FR2010/000483
§ 371 (c)(1),
(2), (4) Date: Feb. 6, 2012

(87) PCT Pub. No.: WO2011/001047
PCT Pub. Date: Jan. 6, 2011

(65) Prior Publication Data
US 2012/0117793 A1 May 17, 2012

(30) Foreign Application Priority Data
Jul. 3, 2009 (FR) ...................................... 09 03312

(51) Int. Cl.
*H01R 13/523* (2006.01)
*G02B 6/38* (2006.01)
(Continued)

(52) U.S. Cl.
CPC ............ *H01R 13/523* (2013.01); *G02B 6/3816* (2013.01); *H01R 43/26* (2013.01); *G02B 6/4292* (2013.01); *Y10T 29/53* (2015.01)

(58) Field of Classification Search
CPC .... H01R 33/00; H01R 13/523; H01R 13/533; H01R 43/26; G02B 6/3816; Y10T 29/53
USPC ......... 29/263, 33 M, 428, 718, 734, 748, 754, 29/755, 759; 439/89, 271, 272, 278; 166/344; 414/22.62, 22.63, 331.01
See application file for complete search history.

(56) References Cited

U.S. PATENT DOCUMENTS 3,491,326 A * 1/1970 Pfister et al. .................. 439/141
3,821,690 A    6/1974 Small
(Continued)

FOREIGN PATENT DOCUMENTS

FR    2 563 662    10/1985
GB    2 203 602    10/1988
(Continued)

*Primary Examiner* — David Bryant
*Assistant Examiner* — Lee A Holly
(74) *Attorney, Agent, or Firm* — Clark & Brody

(57) ABSTRACT

The invention relates to a device (1) for connecting/disconnecting a submersible connector (100) provided with a male portion (101) and a female portion (102), to a related connection/disconnection method, as well as to the various possible uses of said device. The device includes means (11, 12) for moving said male and/or female portions of the connector (100) between a connection position and a disconnection position, and vice versa, and is characterized in that the device further includes a system (16) for injecting a fluid (20) around said male (101) and female (102) portions of the connector (100) when the latter is moved from the connection position to the disconnection position and vice versa, in order to insulate the male and female portion from the water surrounding the connector (100), the injection system (16) being located outside the connector (100).

16 Claims, 5 Drawing Sheets

(51) Int. Cl.
*H01R 43/26* (2006.01)
*G02B 6/42* (2006.01)

(56) References Cited

U.S. PATENT DOCUMENTS

| | | | | |
|---|---|---|---|---|
| 4,142,770 A | * | 3/1979 | Butler et al. | 439/140 |
| 4,391,330 A | | 7/1983 | Kiefer | |
| 4,682,848 A | * | 7/1987 | Cairns et al. | 385/69 |
| 6,932,636 B2 | * | 8/2005 | Abbey et al. | 439/201 |
| 7,080,996 B2 | * | 7/2006 | Ostergaard | 439/188 |
| 7,874,872 B2 | * | 1/2011 | Kaine | 439/587 |

FOREIGN PATENT DOCUMENTS

| | | | |
|---|---|---|---|
| GB | 2 342 461 | 4/2000 | |
| NO | 20076631 L * | 6/2009 | F16L 1/20 |
| WO | 91/13474 | 9/1991 | |
| WO | 98/21785 | 5/1998 | |
| WO | 99/31540 | 6/1999 | |
| WO | WO 2009082240 A1 * | 7/2009 | |

* cited by examiner

PRIOR ART
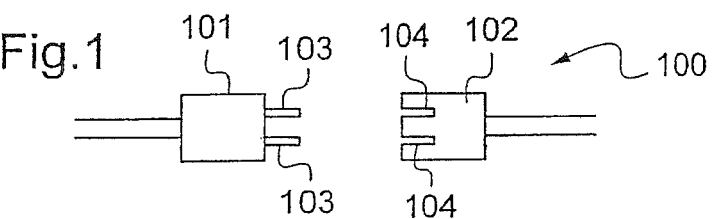
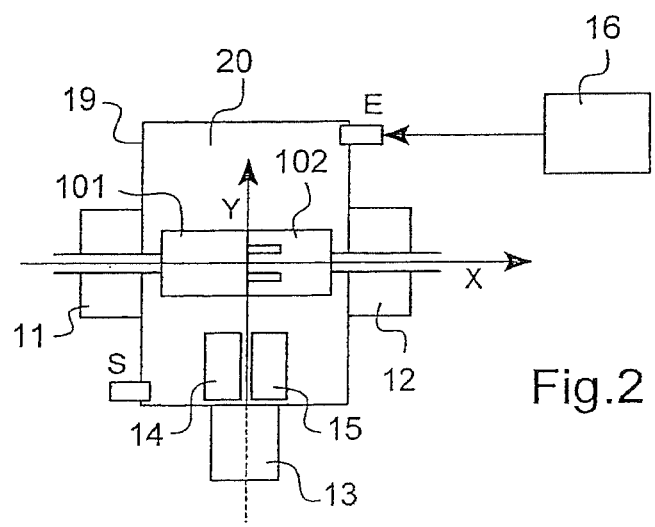
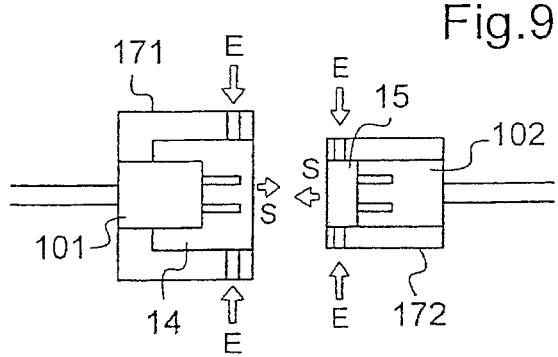

CONNECTION DEVICE FOR A SUBMERSIBLE CONNECTOR

The present invention relates to the field of devices for connecting or disconnecting a submersible connector.

These connectors are used for example to connect scientific or oil instrumentation to a submarine energy or data transmission network. These connectors may more generally be used in all types of application in which they are intended to be submerged, for example in nuclear applications.

This type of connector 100 generally comprises two parts of complementary shape, namely a male part 101 and a female part 102, as shown diagrammatically in FIG. 1.

This connector may be an electrical, optical or opto-electrical connector, as a function of the applications envisaged.

In all cases, it is crucial that it is sealed from the water that surrounds it in all phases of its use.

In particular, this connector must be watertight when it is in a connection position or a disconnection position, but also during the steps of connecting or disconnecting its male part 101 and female part 102.

The disconnection position is shown in FIG. 1. In this position, the male part 101 and the female part 102 of the connector are at a distance from each other.

It is thus clear that, in the absence of protection of the male and female parts of the connector, water may be brought into contact with the pins 103, 104 by which an electrical or optical signal is conveyed when the connector is in the connection position.

Now, these electrical or optical pins 103, 104 may not be brought into contact with water or particles in suspension in water if the connector is required to function normally when it is in the connection position.

In fact, an electrical connector can operate only in a clean dielectric environment. An optical connector can operate only in an environment that is optically transparent in a predetermined range of wavelengths. An opto-electrical connector can operate only in a dielectric medium that is optically transparent in a predetermined range of wavelengths.

Devices for connecting/disconnecting submersible connectors have therefore been proposed to alleviate these problems. These connectors are generally submarine connectors.

A first known type of submarine connector, in this instance an electrical connector, is disclosed in the document WO 91/13474, for example.

It uses a flexible chamber filled with fluid under pressure. The chamber is in fluidic communication with an access orifice taking the form of a flexible cylindrical pipe discharging to the exterior of the connector. When the submarine connector is installed, this means that the orifice discharges into the seawater.

The female part of the connector is disposed at the end of the chamber communicating with the orifice and takes the form of a peripheral contact.

The male part of the connector is formed of a cylindrical rod adapted to be moved in the orifice. The diameter of the cylindrical rod is slightly greater than that of the access orifice. As a function of the position of the rod, its end may then be in contact with the peripheral contact or not.

For moving the rod and consequently performing the connection or disconnection operations of the connector, the connector also comprises a spring-mounted intermediate rod, made from a material that is not a conductor of electricity, having a diameter slightly greater than that of the access orifice.

A first end of the spring is fixed to the end of the chamber that is opposite the end communicating with the orifice. The other end of the spring is in contact with a first end of the intermediate rod. The other end of the intermediate rod is in contact with the end of the rod forming the male part of the connector that is adapted to come into contact with the peripheral contact.

The spring, the intermediate rod and the rod forming the male part of the connector are thus integrated into the connector and moreover mounted in series in the flexible chamber of the connector.

In the disconnection position the spring, then in its natural position, extends over the greater part of the chamber. The spring then holds the intermediate rod in a position in which it is, on the one hand, in contact with the peripheral contact and, on the other hand, partially accommodated in the orifice. Consequently, the rod forming the male part of the connector is itself held inside the orifice.

To effect the connection of the connector, a force is then exerted on the rod forming the male part of the connector. This force pushes on the intermediate rod which then compresses the spring.

The connection of the connector is finally obtained when the rod forming the male part of the connector and the peripheral contact are in contact.

The chamber is sealed thanks to the deformability of the wall of the orifice, comprising, regardless of the position of the connector, a relatively large area of contact with one or the other of the rods, the diameter of which is slightly greater than that of the orifice.

The access orifice of the chamber is thus always blocked whatever the position of the connector, to prevent the introduction of seawater into the chamber.

However, a loss of seal of this type of device is encountered when it is connected/disconnected, seawater entering the chamber via gaps that are formed between the wall of the orifice and the rods.

To remedy this problem of loss of seal, there has been proposed another type of connector, for example an electrical connector, disclosed in the document WO 99/31540. This type of connector is known as a "rolling seal" connector.

In this type of connector, the male and female parts are each disposed in a chamber filled with a dielectric fluid, for example oil, closed by a valve.

In the disconnection position, the chambers are separated and sealed by the valve. Seawater is therefore unable to reach the interior volume of the chambers.

When it is required to connect the male and female parts of the connector, then the two chambers are brought into contact. Bringing the two chambers into contact causes the valves to be opened by an actuation system integrated into the connector itself.

The actuation system opens the valves so that seawater is not able to enter either of the two chambers. In respect of their function, the valves may be regarded as similar to the rods from the document WO 91/13474 blocking the orifice providing access to the chamber.

Once the valves are open, the two initial chambers then form a single watertight chamber.

The male and female parts of the connector may then be connected. To this end, the connector incorporates another actuation system that is dedicated to moving the male and female parts of the connector inside the chamber.

The same actuation system is used again to disconnect the male and female parts of the connector.

The male and female parts of the connector are always bathed in the dielectric fluid, thus preventing seawater from being able to come into contact with the male and female parts of the connector.

This type of connector has the following disadvantages, however.

In fact, "rolling seal" type connectors are relatively complex in that they incorporate diverse mechanical systems for actuating, on the one hand, opening/closing of the valves and, on the other hand, controlling the movement of the male and/or female parts of the connector.

Moreover, high forces are necessary for operating the various mechanical systems of the connector. Now, the system for moving the male and female parts is generally actuated by a remote-controlled submarine robot separate from the connector. This implies that the submarine robot is able to transmit a relatively high power to effect the connection/disconnection of this type of connector.

More generally, integrating the various actuation systems in the connectors themselves prevents maintenance while the connector is in the water. Also, existing connectors must be capable of remaining in operation for a number of years under difficult environmental conditions (high pressure, for example).

It is therefore not rare for connectors to fail prematurely, repairing them then requiring them to be raised to the surface.

An objective of the invention is therefore to propose a device for connecting/disconnecting a submersible connector providing a seal to the water around the connector and the design and maintenance of which are simplified.

To achieve this objective, the invention proposes a device for connecting/disconnecting a submersible connector provided with a male part and a female part, the device comprising means for moving at least one of said male or female parts of the connector between a connection position and a disconnection position and vice versa, characterized in that it further comprises a system for injecting a fluid around the male and female parts of the connector when the latter connector goes from its connection position to its disconnection position and vice versa, in such manner as to isolate them from the water around the connector, the injection system being external to the connector.

The device may have other technical features of the invention, alone or in combination:
- at least one chamber comprising at least one opening for receiving the fluid isolating said male and female parts from the water around the connector when the latter connector goes from its connection position to its disconnection position and vice versa and at least one opening for evacuating that fluid to the exterior of the chamber;
- a chamber in which the male and female parts of the connector are accommodated;
- two chambers one of which comprises the male part of the connector and the other comprises the female part of the connector, the two chambers forming complementary male and female parts adapted to nest one in the other, each chamber comprising at least one opening for receiving the fluid when the connector goes from its connection position to its disconnection position and vice versa and at least one opening for evacuating that fluid when it is in fluidic communication with the water around the connector;
- sealing means for sealing said male and female parts of the connector from the water around the connector when the connector is in the disconnection position;
- the sealing means are external to the connector;
- means for moving said sealing means between the connection position and the disconnection position and vice versa;
- the means for moving the sealing means comprise a spreader adapted to be brought at the same time into contact with the means for moving the male and female parts of the connector;
- the spreader has a symmetrical shape, for example a triangular shape;
- first return means mounted between a frame of the device and the means for moving the sealing means, for moving said sealing means when the connector goes from its disconnection position to its connection position;
- the means for moving the male part of the connector comprise a first rack and a first pinion adapted to drive said means for moving the male part via its rack and the means for moving the female part of the connector comprise a second rack and a second pinion adapted to drive said means for moving the female part via its rack;
- the two pinions cooperate with each other and are preferably identical;
- second return means mounted between the means for moving the male part of the connector and the means for moving the female part of the connector to connect said male part and said female part to each other.

The device may be used to connect or disconnect the male and female parts of a submersible electrical connector, the fluid for isolating said male and female parts of the connector from the surrounding water being a dielectric fluid.

The device may also be used to connect or disconnect the male and female parts of a submersible optical connector, the fluid for isolating said male and female parts of the connector from the surrounding water being a fluid that is optically transparent in a predetermined range of wavelengths.

The invention also proposes a method of connecting/disconnecting a submersible connector provided with a male part and a female part, characterized in that, from an injection system external to the connector, a fluid is injected around the male and female parts of the connector when the latter connector goes from its connection position to its disconnection position and vice versa in such manner as to isolate them from the water around the connector.

The steps of the method may also be characterized as follows:
- the step consisting in the connector going from its connection position to its disconnection position and vice versa includes a sub-step consisting in moving the sealing means of the male and female parts of the connector in a direction perpendicular to the direction of movement of said male and female parts;
- the fluid is injected at increased pressure relative to the water around the connector.

Other features, aims and advantages of the invention are stated in the following detailed description given with reference to the following figures:

FIG. 1 shows a conventional submersible connector in a disconnected state.

FIG. 2 is a diagram of a device of the invention for connecting or disconnecting the FIG. 1 connector, including means for confining a fluid around the male and female parts of the connector;

Figure 5:
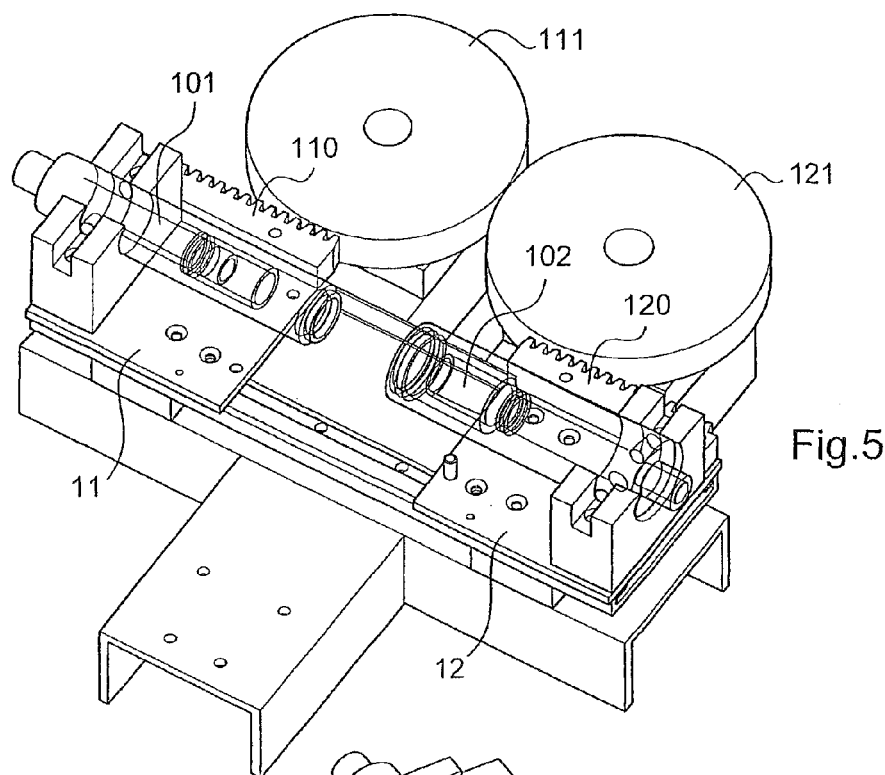
Figure 6:
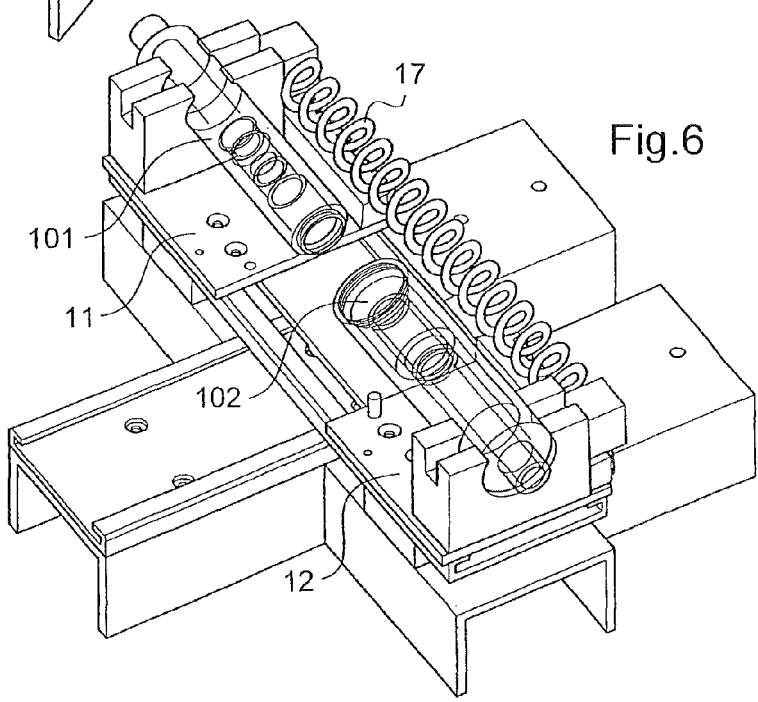
Figure 7:
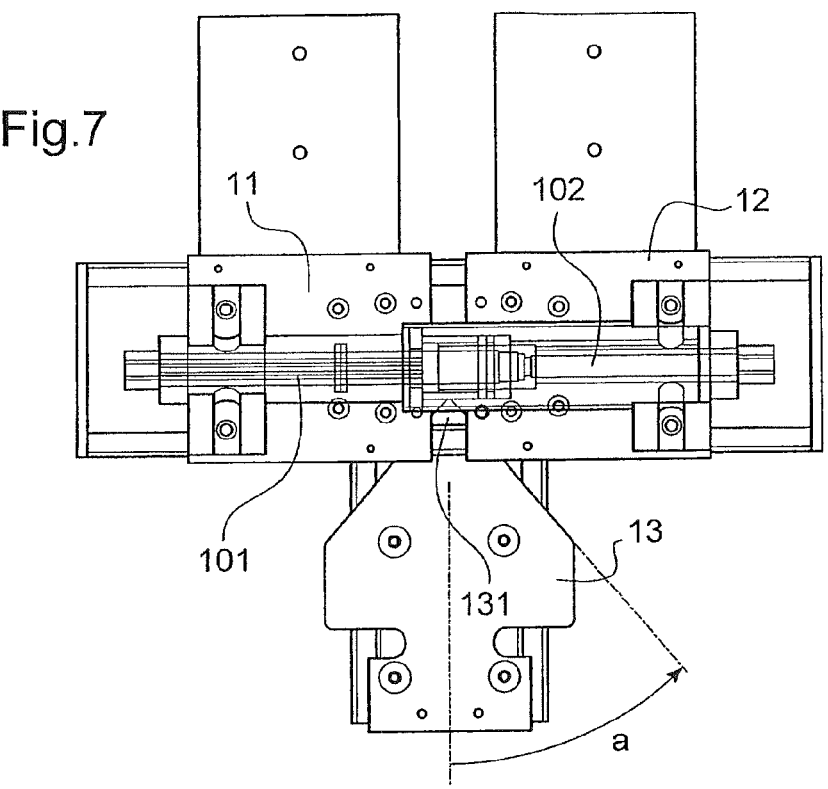
Figure 8:
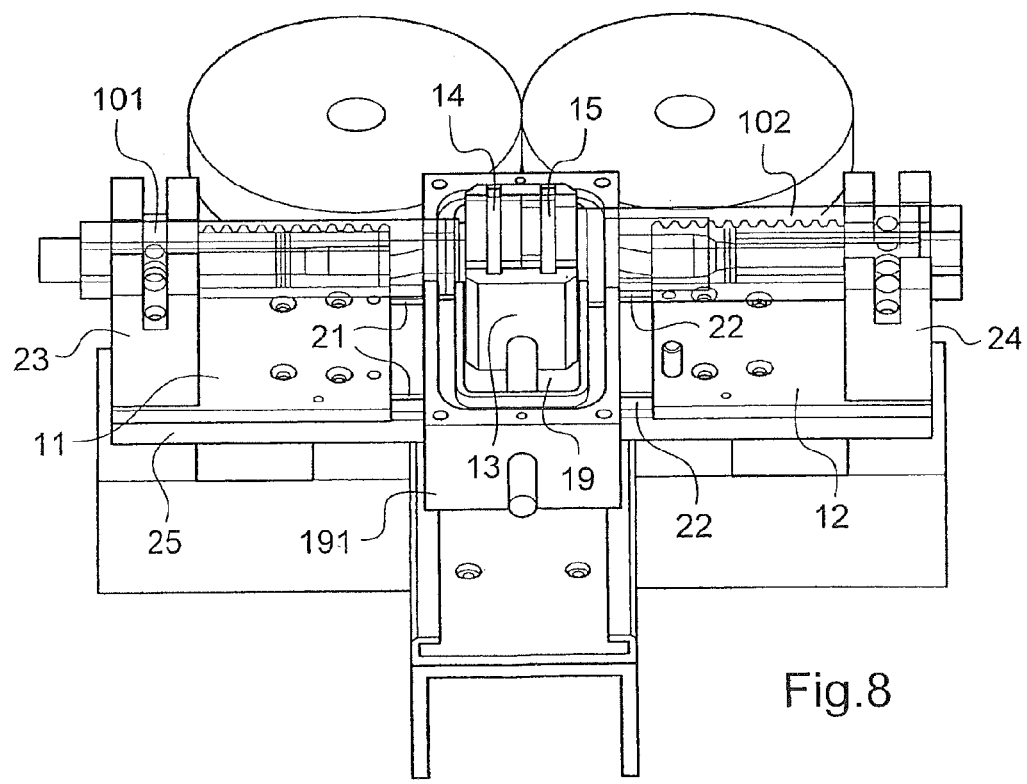

FIG. 3, which comprises FIGS. 3a to 3e, shows the various positions of the connection/disconnection device from FIG. 2 as the connector from FIG. 1 goes from its disconnection position to its connection position;

FIG. 4, which comprises FIGS. 4a to 4e, shows the various positions of the connection/disconnection device from FIG. 2 as the connector from FIG. 1 goes from its connection position to its disconnection position;

FIG. 5 is a diagram showing one embodiment of means included in the device of the invention for moving the male and female parts of the connector;

FIG. 6 is a diagram showing a variant of the means for moving the male and female parts of the connector;

FIG. 7 is a diagram showing one embodiment of means for moving sealing means of the male and female parts of the connector, included in the device of the invention;

FIG. 8 is a perspective view of an embodiment conforming to the FIG. 2 diagram;

FIG. 9 is a diagram of a connection/disconnection device of the invention in which the means employed to confine the fluid around the male and female parts of the connector differ from those of the embodiment shown in FIG. 2.

FIG. 2 shows diagrammatically a connector 100 in a connection position and a device for connecting/disconnecting that disconnector 100.

The connection/disconnection device 1 comprises means for moving the male part 101 of the connector in translation and means 12 for moving the female part 102 of the connector is translation. The male part 101 and the female part 102 move in translation in opposite directions that coincide with the axis x shown.

It also comprises means 13 for moving the sealing means 14, 15 of the male and female parts of the connector. These sealing means 14, 15 are shown in their rest position in FIG. 2. They have been inserted between the male part 101 and the female part 102 of the connector 100 in the disconnection position of the connector.

To this end, as shown in FIG. 2, the means 13 may for example be means for moving the sealing means 14, 15 in translation in a direction (the axis y shown) perpendicular to the direction of movement of the male part 101 and the female part 102 of the connector.

To this end, the sealing means 14, 15 are fastened to the means 13.

However, for fixing the sealing means 14, 15 to the male part 101 and the female part 102 of the connector, the latter are detached from the means 13. This fixing may be effected by clipping, for example.

The sealing means 14, 15 consist of plugs having a shape adapted to cover the male part 101 and the female part 102, respectively, of the connector. These plugs 14, 15 may be made from a polymer material or from metal. The male part 101 and the female part 102 of the connector and their respective sealing means 14, 15 are disposed in a chamber 19.

This chamber 19 has two openings for a fluid 20, namely an inlet opening E and an outlet opening S.

The device finally comprises an injection system 16 for filling this chamber with the fluid 20.

The injection system 16 includes a storage tank and possibly a pump.

The storage tank may be made from a deformable material, for example, in particular for submarine applications. In this case it is thus able to withstand the pressure of the surrounding water without deteriorating, the pressure of the fluid in the storage tank being the same as that of the surrounding water, moreover.

The pump, if used, is employed to inject the fluid from the storage tank toward the male and female parts of the connector at an increased pressure relative to the water around the connector.

Moreover, if the storage tank is deformable, the pump may then be a low power pump capable of producing a slight increase in pressure of the order of a few mbar relative to the water around the connector.

The pressure increase depends notably on the viscosity of the fluid used. The more viscous the latter fluid, the lower the pressure increase may be.

The introduction of the fluid 20 into the chamber 19 when the connector goes from its connection position to its disconnection position and vice versa enables the male part 101 and the female part 102 of the connector to be isolated from the water around the connector. The fluid 20 entering the chamber 19 via the inlet opening E leaves it via the outlet opening S.

The outlet opening S may discharge directly into the water or be in fluidic communication with a fluid recovery system (not shown). If used, this recovery system may route the fluid 20 to the fluid injection system 16, possibly after treatment.

This fluid 20 is dielectric for an electrical connector, optically transparent in a predetermined range of wavelengths for an optical connector, and both dielectric and optically transparent for a predetermined range of wavelengths for an optoelectrical connector.

The range of wavelengths is predetermined as a function of the wavelengths of the optical signal to be transported by the optical fiber on which the connector is situated.

Numerous oils, such as mineral and silicone oils, may be suitable as the fluid 20 for isolating the male part 101 and the female part 102 of the connector from the surrounding water.

The fluid 20 may be injected at increased pressure relative to the pressure of the surrounding water to prevent water entering via the outlet S of the chamber 19. Alternatively, there may be provided at the outlet S a check valve or a drain basin. In this variant, the injection system 16 could for example provide a deformable storage tank, no pump being provided and no increased pressure in the chamber 19 being necessary in this situation.

The fact of being able to fill the chamber 19 with this fluid enables the male part 101 and the female part 102 of the connector to be immersed in this fluid when necessary, i.e. during steps of connecting or disconnecting the connector. During these steps, the chamber 19 enables the fluid to be confined around the male part 101 and the female part 102 of the connector, the increased pressure, the check valve or the like preventing water entering the chamber 19.

This prevents water from being brought into contact with the pins 103, 104 of the connector.

FIG. 8 is a perspective view of one embodiment of the device shown diagrammatically in FIG. 2 when the device is in the disconnection position.

In this FIG. 8, the male part 101 and the female part 102 of the connector 100 are respectively mounted on means 11, 12 for moving of the male part 101 and the female part 102 of the connector 100 in translation, which means notably include plates mounted on rails 21, 22. The plates are adapted to be moved ml translation along rails produced in another plate of the device, this plate being fixed. The male part 101 and the female part 102 of the device are mounted on the plates by way of mounting means 23, 24 fixed to the plate 11 and to the plate 12, respectively. The male part 101 and the female part 102 of the connector 100 may be unfastened from the mounting means 23, 24 when required.

The chamber 19 is constituted by two superposed half-casings, only one of which 191 is shown in FIG. 8, which enables the disposition of the various means of the device relative to the male part 101 and the female part 102 of the connector 100 within the chamber 19 to be shown.

As may be seen, the means constituting the connection/disconnection device (the means 13, the plugs 14, 15, the means 11, 12 for moving in translation the male part 101 and the female part 102 of the connector, the injection system 16)

are external to the connector. The connector employed is basic, all of the complexity of the system being external to the connector. Thus if a part of the connection/disconnection device is defective, it is relatively easy to carry out maintenance under water, or even to change it under water.

The steps of connecting and disconnecting the device of FIG. 2 or FIG. 8 are described in detail next with reference to FIGS. 3 and 4.

For simplicity, the chamber 19 is not shown in FIGS. 3 and 4.

Once the connector has been positioned relative to the connection device, the connection of the connector 100 is effected as follows.

Figure 3A:
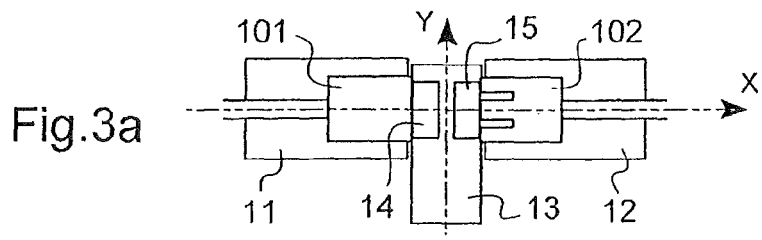

When the connector 100 is in the disconnection position, as shown in FIG. 3a, fluid is injected into the chamber 19, the male part 101 and the female part 102 of the connector 100 thus being immersed in the fluid.

Figure 3B:
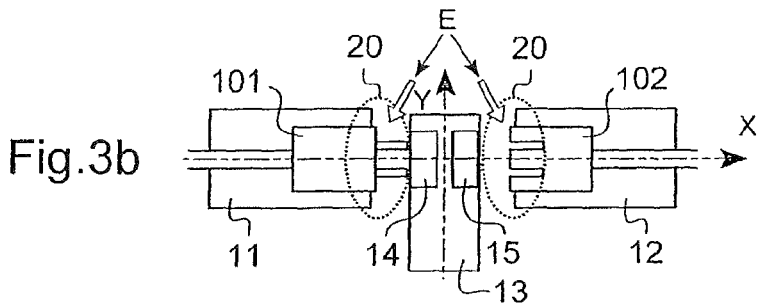

The male part 101 and the female part 102 of the connector 100 are then moved, moving the means 11, 12 in translation in opposite directions. These directions correspond to the axis of the connector and coincide with the axis x. At the end of this step, the male part 101 and the female part 102 of the connector are therefore separated from the means 13 for moving the sealing means 14, 15 of the connector, as shown in FIG. 3b.

The means 13 for moving the sealing means 14, 15 are then moved in translation in a direction perpendicular to the direction of movement of the male part 101 and the female part 102 of the connector in order that the sealing means 14, 15 be extracted from the area of movement of the male part 101 and the female part 102 of the connector. This movement in translation is therefore effected along the axis y of the orthogonal system of coordinates (x, y) shown in FIG. 3, in a direction seeking to move the sealing means 14, 15 away from the male part 101 and the female part 102 of the connector. After this step, the device is in the position shown in FIG. 3c.

The male part 101 and the female part 102 of the connector are then moved, moving in translation the means 11, 12 in opposite directions in such manner that the male part 101 and the female part 102 are connected.

Figure 3C:
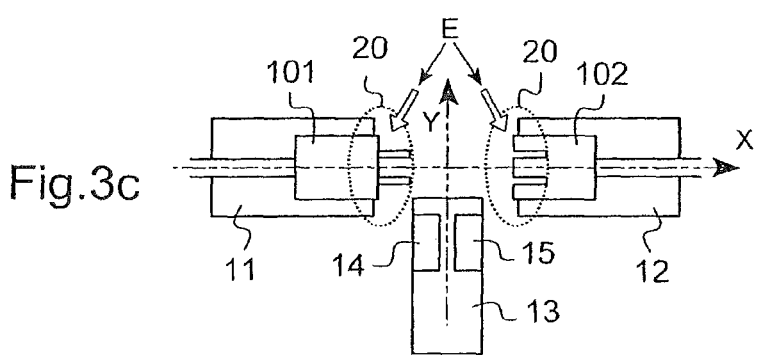
Figure 3D:
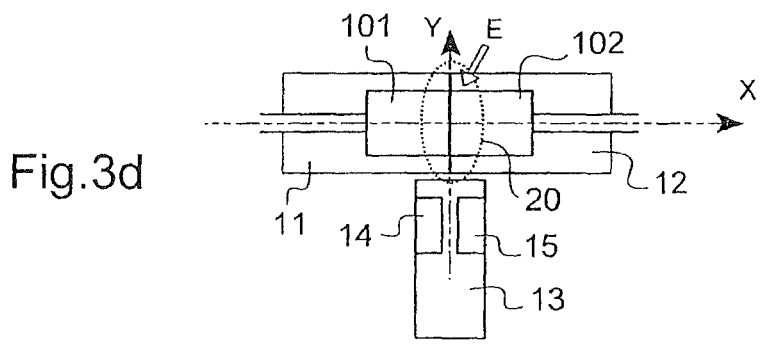

At the end of this step, the connector is in the connection position, as shown in FIG. 3d. FIG. 3d represents the situation represented in FIG. 2, the chamber 19 again being filled with the fluid 20 coming from the injection system 16.

During all the steps shown in FIGS. 3b, 3c and 3d, fluid 20 is injected into the chamber 19, in such manner that the male part 101 and female part 102, and more particularly the pins 103, 104, of the connector are not brought into contact with water.

Figure 3E:
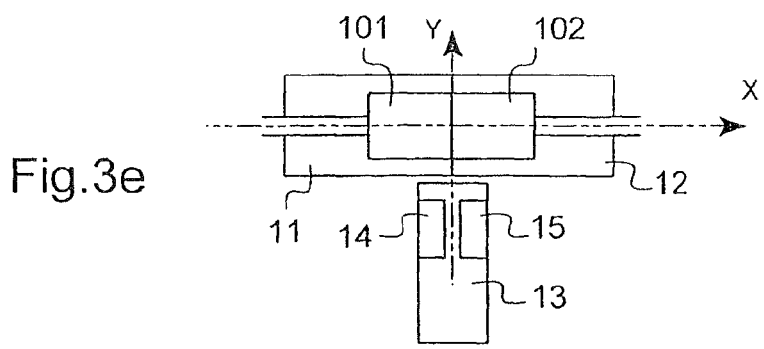

Thus the final step consists in stopping the injection of fluid into the chamber 19, as shown in FIG. 3e.

After a period of use, the connector 100 may then be disconnected in the following manner, once the connector 100 has been positioned relative to the connection/disconnection device.

Figure 4A:
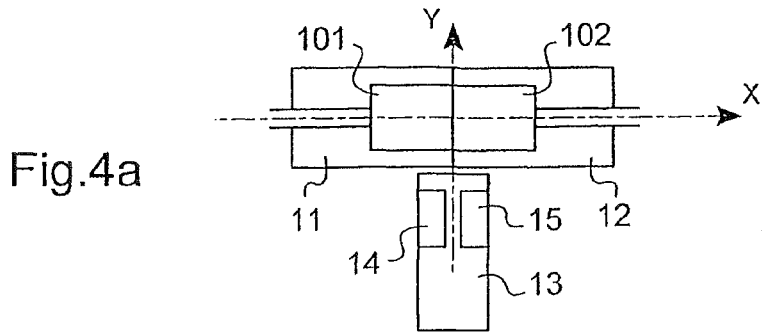

FIG. 4a corresponds to the connection position of the connector when it is operating. It conforms in all respects to the position of the connector shown in FIG. 3e.

When the connector 100 is in the connection position, as shown in FIG. 4a, a fluid 20 is injected into the chamber 19, the male part 101 and the female part 102 of the connector 100 thus being immersed in the fluid 20.

Figure 4B:
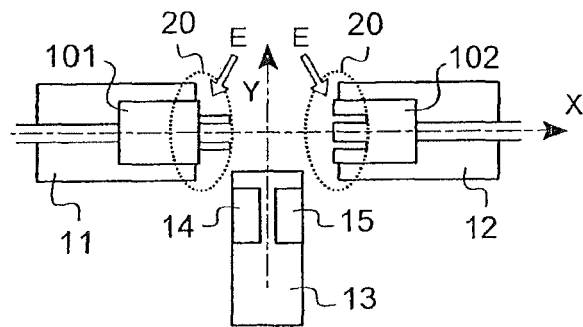

The male part 101 and the female part 102 of the connector 100 are then moved, moving the means 11, 12 in translation in opposite directions, to disconnect the male part 101 and female part 102. This direction corresponds to the axis of the connector and coincides with the axis x. At the end of this step, the male part 101 and the female part 102 of the connector are therefore separated from the means 13 intended to move the sealing means 14, 15 of the connector, as shown in FIG. 4b.

The means 13 for moving the sealing means 14, 15 are then moved in translation in a direction perpendicular to the direction of movement of the male part 101 and the female part 102 of the connector in order for the sealing means 14, 15 to be disposed between the male part 101 and the female part 102 of the connector. This movement in translation is therefore effected along the axis y of the orthogonal system of coordinates (x, y) shown in FIG. 4, in a direction that moves the sealing means 14, 15 of the male part 101 and the female part 102 of the connector toward each other. At the end of this step, the device is in the position shown in FIG. 4c.

The male part 101 and the female part 102 of the connector are then moved by moving the means 11, 12 in translation in opposite directions, so that the male part 101 and the female part 102 come into contact with the sealing means 14, 15.

Figure 4C:
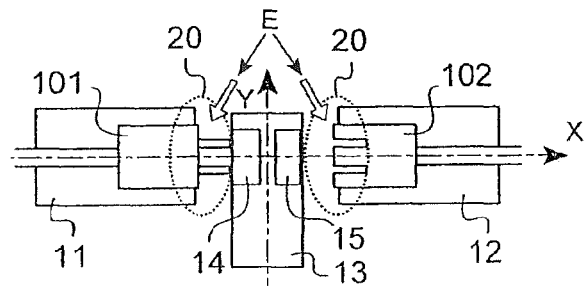
Figure 4D:
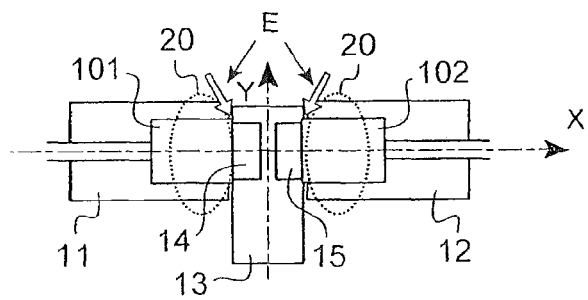

At the end of this step, the connector is in the disconnection position, as shown in FIG. 4d.

During all the steps shown in FIGS. 4b, 4c and 4d, fluid continues to be injected into the chamber in such manner that the male part 101 and the female part 102 of the connector are not brought into contact with the water around the connector.

Figure 4E:
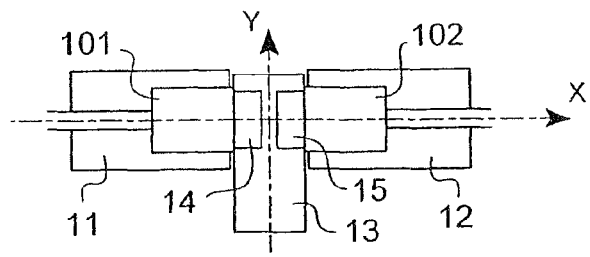

Thus the final step consists in halting the injection of fluid, as shown in FIG. 4e.

After connecting or disconnecting the connector, the connection/disconnection device may be unfastened from the connector. This avoids leaving it in place and therefore enables it to be used for another connection/disconnection operation or, as required, to remove it from the water for maintenance.

Different possible embodiments of the means 11, 12 for moving the male part 101 and the female part 102 of the connector, the means 13 for moving the sealing means 14, 15, and finally the chamber receiving the fluid coming from the injection system 16 are described in detail next with reference to FIGS. 5 to 8. The injection system 16 is not shown in these FIGS. 5 to 8.

FIG. 5 shows one embodiment of the means 11, 12 for moving the male part 101 and the female part 102 of the connector 100.

In this embodiment, the means 11 for moving the male part 101 of the connector 100 comprise a first rack 110 and a first pinion 111 adapted to drive said means 11 for moving the male part via its rack 110.

Moreover, the means 12 for moving the female part 102 of the connector comprise a second rack 120 and a second pinion 121 adapted to drive said means 12 for moving the female part via its rack 120.

To ensure synchronized movement in translation in opposite directions of the male part 101 and the female part 102, the two pinions 111, 121 mesh with each other.

The two pinions 111, 121 are preferably identical. In this case they therefore have the same diameter and the same number of teeth, which makes it possible to ensure identical movement at the same speed of the two parts 101, 102 of the connector 100.

In this embodiment, the means 11, 12 for moving the male part 101 and the female part 102 of the connector 100 are therefore connected to each other to ensure synchronized movement of the two parts 101, 102 of the connector.

With this embodiment, actuation means (not shown) may therefore be provided acting on only one of the two pinions 111, 121 to move the means 11 and the means 12. These actuation means consist of a remote-controlled submersible robot, for example, separate from the connection/disconnection device.

It could instead be envisaged that the two pinions are not coupled, each pinion thus being actuated independently.

Moreover, the pinions 111, 121 enable stepping down of the forces that are applied to them, which enables actuation means of relatively low power to be used to act on the pinions.

As shown in FIG. 6, return means 17 such as a spring may moreover be mounted between the means 11 and the means 12 for moving the male part 101 and the female part 102 of the connector 100.

The return means 17 exert a return force that moves the male part 101 and the female part 102 of the connector 100 toward each other when no external action is exerted on the means 11 and the means 12 for moving the male part 101 and the female part 102 of the connector 100.

Accordingly, if the means 13 carrying the sealing means 14, 15 are situated away from the area of movement of the male part 101 and the female part 102 of the connector, these two parts 101, 102 are placed automatically in the connection position.

And if the means 13 carrying the sealing means 14, 15 are situated between said male part 101 and said female part 102 of the connector, then the male part 101 and the female part 102 are placed automatically in the disconnection position.

This ensures that the male and female parts of the connector are not brought into contact with water.

Apart from the fact that these return means make the operation of the device 1 more secure, they enable limitation of the number of operations for connection/disconnection necessitating actuation of the means 11, 12 via the submersible robot, in that some operations are effected automatically.

The return means 17 may in particular be installed in combination with the embodiment described with reference to FIG. 5, which uses racks 110, 120 and pinions 111, 121. In this case, the return means 17 enable only connection and are not operative in disconnection. On the other hand, the racks and pinions are necessary for disconnection and removal of the plugs 14, 15.

FIG. 7 shows an embodiment of means 13 included in the device of the invention for moving the sealing means 14, 15 of the male part 101 and the female part 102 of the connector 100.

This means 13 comprise a spreader 131 disposed at one end of said means 13 and adapted to be brought into contact at the same time with the means 11, 12 for moving the male part 101 and the female part 102 of the connector.

To ensure that the spreader 131 is brought into contact at the same time with the male part 101 and the female part 102 of the connector, the letter spreader has a shape that is symmetrical with respect to the direction of movement of the means 13, which coincides with the longitudinal axis of the means 13.

For example, the spreader 131 may have a triangular shape. In this case, the force $F_1$ exerted on the means 13 transmits a force $F_2$ to the means 11, 12 for moving the male part 101 and the female part 102 of the connector in accordance with the equation: $F_2=F_1/(2*\cos(a))$.

The angle a is the angle between the axis of symmetry of the triangle passing through its apex intended to be in contact with the means 11, 12 for moving the male part 101 and the female part 102 of the connector and any side of that triangle passing through the apex. The angle a is shown in FIG. 7.

Also provided are return means (not shown), such as a spring, mounted between a frame of the device 1 and the means 13 for moving the sealing means 14, 15 of the male and female parts of the connector. To be more precise, these return means are chosen so that they automatically withdraw the sealing means 14, 15 from the moment at which they are disengaged from the male part 101 and the female part 102 of the connector 100.

To effect the disengagement of the male part 101 and the female part 102 actuation means (not shown) are provided acting on the male part 101 and the female part 102. This reduces the number of operations necessary for connection/disconnection of the male part 101 and the female part 102 of the connector.

It could instead be envisaged that return means 17, as shown in FIG. 6, be further provided between the means 11, 12 for moving the male part 101 and the female part 102 of the connector 100. Disengagement of the male and female parts of the connector then necessitates a slightly greater force to oppose the return force of the return means 17. However, this enables the male and female parts to be connected automatically, after the return means have enabled withdrawal of the means 13 carrying the sealing means 14, 15 from out of the area of movement of the male part 101 and the female part 102 of the connector.

It could instead be envisaged that there be no return means between the means 13 and the frame, but that there are return means 17, as shown in FIG. 6, between the means 11, 12 for moving the male part 101 and the female part 102 of the connector 100. The means 11, 12 for moving the male part 101 and the female part 102 of the connector 100 are then commanded via the means 13 carrying the sealing means 14, 15. The means 13 are then actuated by actuation means (not shown) provided in a submersible robot, that robot being separate from the connection/disconnection device.

In another variant, there could be provision for the means 11, 12 for moving the male part 101 and the female part 102 of the connector 100, together with the means 13 carrying the sealing means of the male part 101 and the female part 102 of the connector 100, all to be actuated independently by means that are not shown here. In this variant, three actuators are therefore provided, a first actuator for example being formed of a rack and a pinion for moving the male part of the connector, a second actuator being formed for example of a rack and a pinion for moving the female part of the connector, the two pinions being independent, and a third actuator for moving the means 13 carrying the sealing means 14, 15.

Finally, FIG. 9 is a diagram of a variant connection/disconnection device relating to how the fluid is confined around the male part 101 and the female part 102 of the connector. In this figure the device 1 is in the disconnection position and the sealing means 14, 15 are not shown.

The device shown in FIG. 9 includes two chambers 171, 172. One chamber 171 of these two chambers 171, 172 surrounds the male part 101 of the connector. The other chamber 172 of these two chambers 171, 172 surrounds the female part 102 of the connector. When the male part 101 and the female part 102 of the connector 100 are connected, the two chambers form one chamber, in a similar manner to what is shown in FIG. 1.

To be more precise, each chamber 171, 172 takes the form of a tank, on the bottom of which is disposed the male or female part of the connector, depending on the chamber concerned. Each chamber 171, 172 has an outlet opening S situated opposite the bottom of the chamber 171, 172 concerned.

The respective outlet openings of the two chambers 171, 172 have dimensions adapted so that the chambers may be nested one in the other.

The two chambers 171, 172 are both adapted to be filled by a fluid supplied by an injection system (not shown), via inlet openings for the fluid in the chambers 171, 172 represented by the letter "E". The injection system conforms to that described for the FIG. 2 embodiment.

Once again, this fluid is dielectric for an electrical connector, optically transparent in a predetermined range of wavelengths for an optical connector, and both dielectric and optically transparent in a predetermined range of wavelengths for an opto-electrical connector.

During the phases of connecting or disconnecting the connector 100, the fluid is injected at an increased pressure relative to the pressure of the water around the connector, so that it escapes via the outlet openings "S" without water being able to enter via these outlet openings.

A pressure increase of a few mbar is sufficient. The pressure increase depends notably on the viscosity of the fluid used. The more viscose the latter fluid, the lower the pressure increase may be.

Means 13 for moving the sealing means 14, 15 are also provided. They conform to any of the various embodiments of the means 13 described hereinabove. The size of each sealing means 14, 15 must nevertheless be adapted to the dimensions of the outlet openings "S" of the associated chamber 171, 172.

Finally in one variant, it may be envisaged that no chamber 191, 192, 171, 172 be provided for confining the fluid 20 around the male part 101 and the female part 102 of the connector.

In this case the fluid must be injected around the male part 101 and the female part 102 at increased pressure relative to the water around the connector, to isolate the male part 101 and the female part 102 from the water.

A pressure increase of a few mbar is sufficient, being adapted to the fluid employed.

The connection/disconnection device 1 of the invention uses simple low-cost connectors incorporating no complex actuation system within the connector itself. In fact, all of the "actuation" part of the device is disposed externally of the connector, and is recoverable and reusable at will when the connector is submerged. This facilitates maintenance and obviously makes it less costly than with existing submersible connectors.

In particular, and as may be seen in FIGS. 5 to 8 in particular, the means 11, 12 for moving the male part 101 and the female part 102 of the connector 100 are not integrated into said male part 101 and said female part 102, but independent of them. In fact, the plates mounted on rails, the means 23, 24 for mounting the connector 100 fixed to these plates, the racks 110, 120 and the pinions 111, 121 are parts separate from and external to the connector 100.

In particular, the means 13 for moving the sealing means 14, 15 of the male part 101 and the female part 102 of the connector 100 and the sealing means 14, 15 themselves are separate from and external to the connector 100.

This represents a definite advantage over the various existing submersible connectors, whether of the "rolling seal" type or not.

Furthermore, using pinions or a spreader, serving as means for stepping down the forces, enables the use of smaller autonomous submersible robots to control the phases of connecting/disconnecting the connector.

The invention claimed is:

1. A device for connecting/disconnecting a submersible connector, the submersible connector (100) being provided with a male part (101) and a female part (102), at least one of said male or female parts of the connector (100) being movable between a connection position and a disconnection position and vice versa, wherein the device for connecting/disconnecting is unfastenable to the submersible connector and comprises:
   one chamber configured to accommodate the male part and the female part of the submersible connector and comprising at least two openings, and
   a system (16) configured to inject a fluid (20) around the male part (101) and the female part (102) of the connector (100) through one of the openings of the chamber and to allow said fluid to evacuate to an exterior of the chamber through the other of the openings of the chamber, when the connector goes from its connection position to its disconnection position and vice versa, so as to isolate the male part (101) and the female part (102) from water surrounding the connector (100).

2. The device as claimed in claim 1, comprising two chambers (171, 172) of which one chamber (171) comprises the male part (101) of the connector and the other chamber (172) comprises the female part (102) of the connector, the two chambers (171, 172) forming complementary male and female parts adapted to nest one in the other, each chamber (171, 172) comprising at least one opening (E) for receiving the fluid (20) when the connector goes from its connection position to its disconnection position and vice versa and at least one opening (S) for evacuating said fluid when said fluid is in fluidic communication with the water around the connector.

3. The device as claimed in claim 1, comprising sealing means (14, 15) for sealing said male and female parts of the connector from the water around the connector when the connector is in the disconnection position.

4. The device as claimed in claim 3, wherein the sealing means (14, 15) are external to the connector.

5. The device as claimed in claim 3, comprising means (13) for moving said sealing means (14, 15) between the connection position and the disconnection position and vice versa.

6. The device as claimed in claim 5, wherein the means (13) for moving the sealing means (14, 15) comprise a spreader (131).

7. The device as claimed in claim 6, wherein the spreader (131) has a triangular shape.

8. The device as claimed in claim 4, comprising first return means mounted between a frame of the device (1) and the means (13) for moving the sealing means (14, 15), said first return means acting on said sealing means (14, 15) to move the sealing means when the connector goes from its disconnection position to its connection position.

9. The device as claimed in claim 1, wherein:
   said at least one of said male or female parts of the connector (100) is movable between the connection position and the disconnection position and vice versa by:
   means (11) for moving the male part (101) of the connector which comprise a first rack (110) and a first pinion (111) adapted to drive said means (11) for moving the male part via its rack (110); and
   means (12) for moving the female part (102) of the connector which comprise a second rack (120) and a second pinion (121) adapted to drive said means (12) for moving the female part via its rack (120);
   wherein the two pinions cooperate with each other.

10. The device as claimed in claim 9, wherein the two pinions (111, 121) are identical.

11. The device as claimed in claim 1, comprising second return means (17) mounted between the means (11) for moving the male part (101) of the connector and the means (12) for moving the female part (102) of the connector to connect said male part (101) and said female part (102) to each other.

12. A method of using the device as claimed in claim 1 comprising connecting or disconnecting the male part (101) and the female part (102) of a submersible electrical connector (100) in water, wherein the fluid (20) for isolating said male part (101) and said female part (102) of the connector from the surrounding water is a dielectric fluid.

13. A method of using the device as claimed in claim 1 comprising connecting or disconnecting the male part (101) and the female part (102) of a submersible optical connector (100) in water, wherein the fluid (20) for isolating said male part (101) and said female part (102) of the connector from the surrounding water is a fluid that is optically transparent in a predetermined range of wavelengths.

14. A method of connecting/disconnecting a submersible connector (100) in water provided with a male part (101) and a female part (102), characterized in that, from an injection system (16) external to the connector (100), a fluid (20) is injected around the male part (101) and the female part (102) of the connector (100) when the connector goes from its connection position to its disconnection position and vice versa in such manner as to isolate said male part (101) and said female part (102) from the water around the connector, wherein the injection system includes a device that is unfastenable to the submersible connector, the device including one chamber configured to accommodate the male part and the female part of the submersible connector and comprising at least two openings, wherein the fluid is injected through one of the openings of the chamber and to allow said fluid to evacuate to an exterior of the chamber through the other of the openings of the chamber.

15. The method as claimed in claim 14, wherein the step comprising the connector (100) going from the connection position to the disconnection position and vice versa includes a sub-step comprising moving the sealing means (14, 15) of the male part (101) and the female part (102) of the connector (100) in a direction perpendicular to the direction of movement of said male and female parts.

16. The method as claimed in claim 14, wherein the fluid (20) is injected at increased pressure relative to the water around the connector.

* * * * *